J. S. HARGER.
TRANSMISSION GEARING.
APPLICATION FILED MAR. 20, 1915.
1,303,660.
Patented May 13, 1919.
2 SHEETS—SHEET 1.
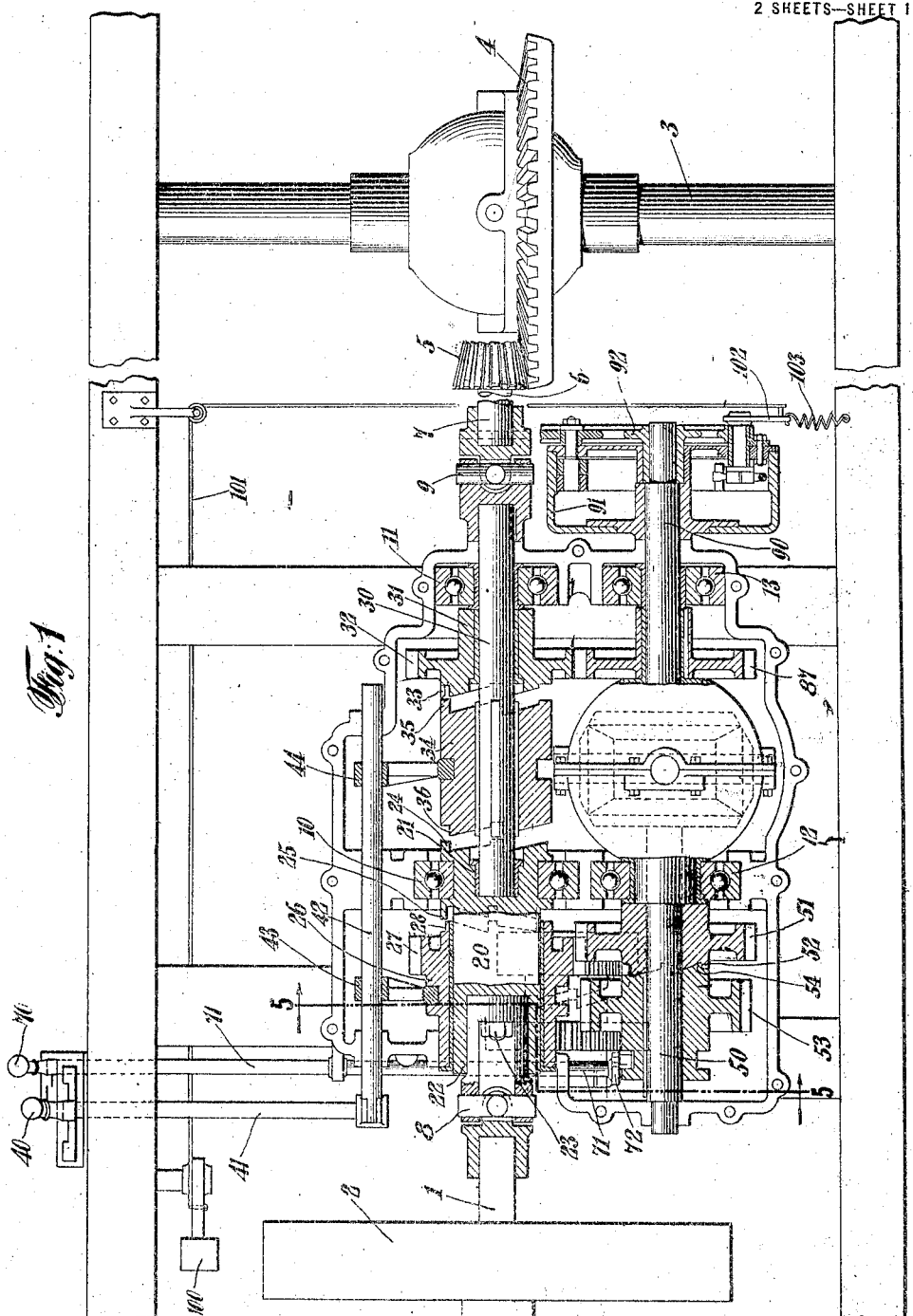

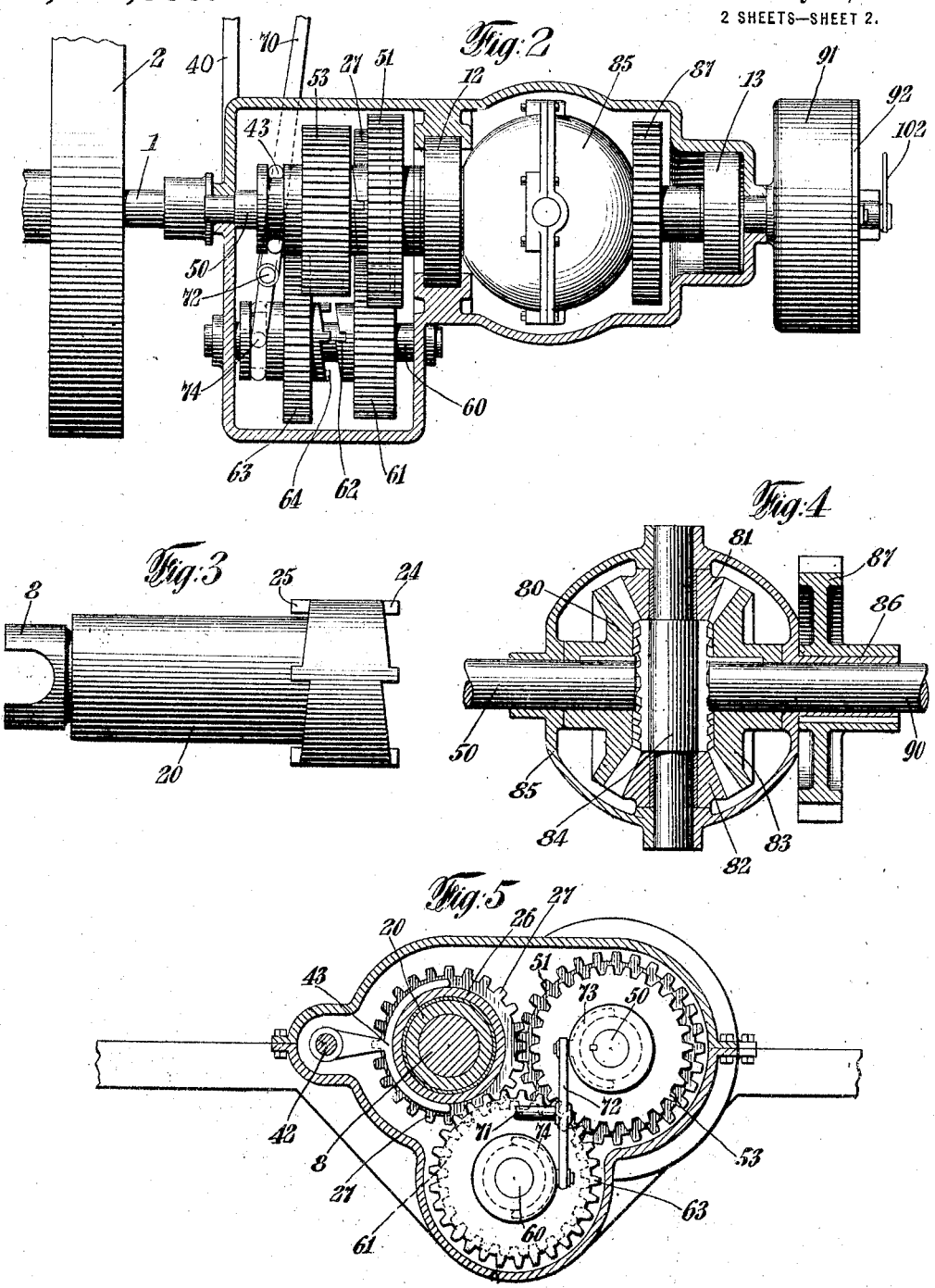

UNITED STATES PATENT OFFICE.

JOHN SANFORD HARGER, OF NYACK, NEW YORK.

TRANSMISSION-GEARING.

1,303,660.  Specification of Letters Patent.  Patented May 13, 1919.

Application filed March 20, 1915. Serial No. 15,710.

*To all whom it may concern:*

Be it known that I, JOHN SANFORD HARGER, of Nyack, in the county of Rockland, and in the State of New York, have invented a certain new and useful Improvement in Transmission-Gearings, and do hereby declare that the following is a full, clear, and exact description thereof.

My invention relates to a transmission gearing, and has for its object to provide a gearing which will transmit any desired speed of revolution from the driving shaft to the driven shaft in either direction without abrupt change or shifting of gears.

A further object of my invention is to provide a transmission gearing which will be disengaged by coupling together the driving and driven shaft in direct drive.

A further object of my invention is to provide a transmission gearing adapted for any purpose for which a transmission gearing is applicable, although it is particularly advantageous for automobiles and for use with gas engines.

A further object of my invention is to provide a transmission gearing which will be of simple, economical, and strong construction, easy to operate, and commercially practicable.

Other and further objects of my invention will be apparent from the following description of one embodiment thereof and from an inspection of the accompanying drawings of said embodiment as applied to an automobile, in which:

Figure 1 is a plan view partly in section, of one embodiment of my invention as applied to an automobile;

Fig. 2 a side elevation of the transmission, with the casing broken away;

Fig. 3 an enlarged side view of the main shaft block;

Fig. 4 an enlarged section of the differential gear construction; and

Fig. 5 a section taken on line 5—5 of Fig. 1 looking in the direction of the arrows.

Similar reference characters refer to similar parts throughout the drawings.

While I have illustrated my invention by the best embodiment thereof known to me, it is not to be restricted to such embodiment which is to be regarded only as typical of many embodiments and uses.

In the embodiment illustrated, which shows my invention as applied to an automobile, M indicates a motor, 1 the motor shaft, and 2 the fly wheel. The rear axle 3 of the automobile has secured thereon bevel gear 4 driven by pinion 5. Pinion shaft 6 is supported in any desired manner and may be connected to shaft 7 by a universal joint (not shown), according to standard practice. The main shaft is formed in two parts,—main shaft block 20, and main shaft 30. Main shaft block 20 is secured at the front to motor shaft 1 by a universal joint 8, and main shaft 30 is secured at the rear to shaft 7 by a universal joint 9. Main shaft block 20 may be supported by bearings as ball bearings 10, and main shaft 30 by bearings as ball bearings 11, according to standard practice.

The back end of main shaft block 20 is provided with a recess 21, lined with a bushing adapted to receive main shaft 30 which turns freely therein. The front end of main shaft block 20 also is recessed at 22, and one member of universal joint 8 is secured therein as by a bolt 23. Main shaft block 20 is provided at its back with clutch teeth 24 facing toward the rear; and spaced therefrom and facing toward the front, with clutch teeth 25. The front portion of main shaft block 20 is reduced in size and provided with a bushing on which is mounted to revolve freely a sleeve 26 having gear teeth 27 thereon, and clutch teeth 28 at the back thereof adapted to engage clutch teeth 25 on main shaft block 20.

Main shaft 30 is provided adjacent its bearing 11 with a bushing on which is mounted to revolve freely a sleeve 31 having gear teeth 32 thereon, and clutch teeth 33 at the front thereof. On main shaft 30, between its sleeve 31 and main shaft block 20, is splined a sliding clutch 34 having at its back clutch teeth 35 adapted to engage clutch teeth 33 on sleeve 31, and at its front clutch teeth 36 adapted to engage clutch teeth 24 on main shaft block 20. Sleeve 26 on main shaft block 20, and sleeve 31 on main shaft 30, are controlled by a single hand lever 40, which is connected to said sleeves in any desired manner as by members 41, 42, 43, and 44.

Parallel with main shaft block 20 and main shaft 30 is a side counter shaft 50, and a bottom counter shaft 60. On side counter shaft 50 is mounted a gear 51 always in mesh with gear 27 on main shaft block 20. Said gear 51 is adapted to turn freely on side counter shaft 50 and is provided with clutch teeth 52. On said side counter shaft 50 also is splined a gear 53, which is provided with clutch teeth 54 adapted normally to engage clutch teeth 52 of gear 51. On bottom counter shaft 60 (Fig. 2) is keyed a gear 61 always in mesh with gear 27 on main shaft block 20, and provided with clutch teeth 62. On said bottom counter shaft 60 also is mounted, to revolve freely, a gear 63 always in mesh with gear 53 on side counter shaft 50. Said gear 63 is provided with clutch teeth 64 adapted to engage clutch teeth 62 of gear 61, but normally disengaged therefrom. Gear 53 on shaft 50, and gear 63 on shaft 60, are controlled by a single hand lever 70 (Fig. 1) which is connected to said gears in any desired manner, as by members 71, 72, 73, and 74 (Fig. 5). The movement of lever 70, which is the reversing lever, moves splined gear 53 (Fig. 2) on side counter shaft 50 from its normally clutched position with loose gear 51, into unclutched position; and the same movement of lever 70 moves loose gear 63 on shaft 60 from its idle and unclutched position into clutched position with fixed gear 61.

Side counter shaft 50 is supported at its forward end by the casing (Fig. 1) and at its rearward end by a bearing as ball bearing 12. The end of said shaft 50 extending beyond said bearing is keyed to a gear 80 (Fig. 4) of a differential gearing. Gear 80 engages gears 81 and 82 mounted on a bushing surrounding stud 84 secured in a casing 85. The other gear 83 of the differential gearing is keyed to a shaft 90 supported by a bearing as ball bearing 13 (Fig. 1). Casing 85 (Fig. 4) at its rearward end is provided with an extension or sleeve 86 on which is keyed a gear 87 adapted to mesh with gear 32 on main shaft 30. The outer end of shaft 90 has mounted thereon a brake drum 91 with which coöperates a brake of any desired type (Fig. 1), a standard internal expansion type 92 being represented for purposes of illustration. Said brake 92 is controlled by a single foot pedal 100 which is connected to and operates brake 92 by members 101, 102, and 103.

Proper provisions for oiling, and for having the gears run in oil or packed in grease, may be applied to the embodiment, in accordance with engineering practice.

The operation is as follows:

When the parts are in normal position as illustrated in Fig. 1, the rotation of motor shaft 1 will turn only main shaft block 20. None of the gears will be rotated, as they receive their rotation from gear 27 of sleeve 26, which in its present position has its clutch teeth 28 out of engagement with clutch teeth 25 of main shaft block 20, and thus will not be rotated by the turning of main shaft block 20. Main shaft 30 will not be rotated as it is rotatably mounted in the bushing in recess 21 of main shaft block 20, and its splined sleeve 34 in its present position has its clutch teeth 36 out of engagement with clutch teeth 24 on main shaft block 20.

If motor shaft 1 is rotating, which also will rotate main shaft block 20, and it is desired to start the automobile illustrated in a forward direction, lever 40 is operated to throw sleeve 26 and sleeve 34 backward. Clutch teeth 28 of sleeve 26 will engage clutch teeth 25 of rotating main shaft block 20, and clutch teeth 35 of splined sleeve 34 will engage clutch teeth 33 of loose gear 32. Gear 27 of sleeve 26 thus will be rotated which will rotate loose gear 51 on side counter shaft 50. The rotation of gear 27 also will rotate keyed gear 61, but as said gear 61 neither meshes nor is clutched in its present position, to any other gear, no operative result will follow. As said gear 51 normally is clutched to splined gear 53 on said side counter shaft 50, said shaft 50 will turn and impart rotation to gear 80 of the differential gearing. Casing 85 of the differential gearing will be held stationary by reason of the load imparted to it by the gear 87 secured thereto which meshes with gear 32 on main shaft 30. Gears 81 and 82 therefore will rotate on their stud 84, which will rotate gear 83, its shaft 90, and brake drum 91. By operating foot pedal 100 by a gradual pressure, brake 92 is operated, which slows down brake drum 91, shaft 90, and its gear 83. This causes casing 85 and its gear 87 to rotate, which imparts rotation to gear 32, thus rotating sleeve 34, main shaft 30, shaft 7, pinion shaft 6, pinion 5, bevel gear 4, and rear axle 3. The speed can be increased or decreased gradually according to the pressure exerted by the brake 92 under the control of foot pedal 100, in accordance with the well understood operation of differential gears. When it is desired to go into direct drive hand lever 40 is thrown in the opposite direction, which disengages sleeve 26 from its clutched position with main shaft block 20, thereby disconnecting all the gears; and at the same time disengages splined sleeve 34 from clutched position with gear 32 and clutches it with main shaft block 20. We thus have a direct drive from motor shaft 1, through main shaft block 20, sleeve 34, main shaft 30, shaft 7, pinion shaft 6, pinion 5, bevel gear 4, to rear axle 3. To stop all rotation of the driven shaft, it is necessary only to move hand lever 40 and its connected parts to neutral position as shown in Fig. 1. It thus is possible to go from stationary position to engine speed as slowly or as rapidly as desired, by a gradual transition, without abrupt changes, or shifting of gears. It is not necessary, moreover, to get the parts up to engine speed before going into direct drive, as it is necessary only to get the car in motion and overcome its starting inertia before going into direct drive. With transmission ordinarily in use, it is necessary to work the gears through all the intermediate speeds before it is possible to go into direct drive.

If motor shaft 1 is rotating, which will rotate main shaft block 20, and it is desired to start the automobile illustrated in a rearward direction, lever 70 is operated to throw gear 53 forward and gear 63 backward (Fig. 2). This will disengage gear 53 from its normally clutched position with gear 51 which will rotate freely on shaft 50 without operative results, and also will move loose gear 63 from its normally unclutched position into clutched position with keyed gear 61. By operating lever 40 in the same manner described above for starting the automobile illustrated in a forward direction, which moves gear 27 into clutched position with main shaft block 20, and splined clutch 34 into clutched position with gear 32, the parts now will operate as before under the control of foot pedal 100 with the exception of direction of rotation. Gear 27 will as before rotate gear 51 and gear 61, but gear 51 now will run idle, and as gear 61 is clutched to gear 63 which meshes with splined gear 53, shaft 50 will rotate in the opposite direction from that previously described.

Many modifications and other embodiments of my invention will be apparent to those skilled in the art without departing therefrom or from the scope of my claims.

Having described one embodiment of my invention what I claim is:

1. The combination of a driving shaft, a driven shaft, and means to transmit rotation from said driving shaft to said driven shaft comprising a differential gearing, and means to connect said differential gearing to said driving shaft comprising a main shaft block, and means to connect said main shaft block to said differential gearing.

2. The combination of a driving shaft, a driven shaft, and means to transmit rotation from said driving shaft to said driven shaft comprising a differential gearing, reducing gears driving said differential gearing from said driving shaft, and gears connecting said differential gearing with said driven shaft, and means for drectily connecting said driving shaft with said driven shaft.

3. The combination of a driving shaft, a driven shaft, and means to transmit rotation from said driving shaft to said driven shaft comprising a differential gearing, reducing gears driving said differential gearing from said driving shaft, and gears connecting said differential gearing with said driven shaft, and means comprising a sliding clutch for directly connecting said driving shaft with said driven shaft.

4. The combination of a driving shaft, a driven shaft, and means to transmit rotation from said driving shaft to said driven shaft comprising a differential gearing, reducing gears driving said differential gearing from said driving shaft, and gears connecting said differential gearing with said driven shaft, and means comprising a sliding clutch for disconnecting said gearing from said driven shaft and directly connecting said driving shaft with said driven shaft.

5. The combination of a driving shaft, a driven shaft, and means to transmit rotation from said driving shaft to said driven shaft comprising a differential gearing, reducing gears driving said differential gearing from said driving shaft, and gears connecting said differential gearing with said driven shaft, and means for disconnecting said differential gearing from said driving shaft and for directly connecting said driving shaft with said driven shaft.

6. The combination of a driving shaft, a driven shaft, and means to transmit rotation from said driving shaft to said driven shaft comprising a differential gearing and means to connect said differential gearing with said driving shaft, said latter means comprising a main gear on said driving shaft, a side counter shaft, a gear on said side counter shaft in mesh with said main gear, means to connect said gear to said differential gearing, a bottom counter shaft, and a gear on said bottom shaft in mesh with said main gear normally running idle.

7. The combination of a driving shaft, a driven shaft, and means to transmit rotation from said driving shaft to said driven shaft comprising a differential gearing and means to connect said differential gearing to said driving shaft, a main gear on said driving shaft, a side counter shaft, a gear on said side counter shaft in mesh with said main gear and adapted to rotate freely on said counter shaft, a gear splined on said counter shaft, and means to connect said gears.

8. The combination of a driving shaft, a driven shaft, and means to transmit rotation from said driving shaft to said driven shaft comprising a differential gearing and means to connect said differential gearing to said driving shaft, a main gear on said driving shaft, a bottom counter shaft, a gear in mesh with said main gear and keyed to said counter shaft, and a gear mounted to rotate freely on said counter shaft and adapted to be clutched to the other gear on said shaft.

9. The combination of a driving shaft, a driven shaft, and means to transmit rotation from said driving shaft to said driven shaft comprising a differential gearing and means to connect said differential gearing with said driving shaft, said latter means comprising a main gear on said driving shaft adapted to be connected to and disconnected from said driving shaft.

10. The combination of a driving shaft, a driven shaft, and means to transmit rotation from said driving shaft to said driven shaft comprising a differential gearing and means to connect said differential gearing to said driving shaft, said latter means comprising a main gear on said driving shaft, a side counter shaft, a gear splined to said side counter shaft, a second gear on said side counter shaft in mesh with said main gear and adapted to rotate freely on said counter shaft and adapted to be clutched with said other gear on said shaft, a bottom counter shaft, a gear in mesh with said main gear keyed to said counter shaft, a second gear on said bottom counter shaft adapted to rotate freely thereon and in mesh with the first-mentioned gear on said side counter shaft, said gears on said side counter shaft being normally clutched, and said gears on said bottom counter shaft being normally unclutched.

11. The combination of a driving shaft, a driven shaft, and means to transmit rotation from said driving shaft to said driven shaft comprising a differential gearing and means to connect said differential gearing to said driving shaft, said latter means comprising a main gear on said driving shaft, a side counter shaft, a gear splined on said side counter shaft, a second gear on said side counter shaft in mesh with said main gear and adapted to rotate freely on said counter shaft and adapted to be clutched with said other gear on said shaft, a bottom counter shaft, a gear in mesh with said main gear keyed to said counter shaft, a second gear on said bottom counter shaft adapted to rotate freely thereon and in mesh with the first-mentioned gear on said side counter shaft, said gears on said side counter shaft being normally clutched together, and said gears on said bottom counter shaft being normally unclutched, and means simultaneously to unclutch the gears on said side counter shaft and to clutch the gears on said bottom counter shaft.

12. The combination of a driving shaft, a driven shaft, and means to transmit rotation from said driving shaft to said driven shaft comprising a differential gearing, a casing for said differential gearing, a gear connected to said casing, a stud mounted in said casing, two of the gears of said differential gearing mounted on said stud, and means to transmit motion from said casing gear.

13. The combination of a driving shaft, a driven shaft, and means to transmit rotation from said driving shaft at variable speeds to said driven shaft comprising a beveled differential gearing, a casing inclosing said gearing, a gear mounted on said casing to transmit motion from said differential gearing, a shaft connected to one of the gears of said differential gearing, a brake on said shaft, and means to apply said brake.

14. The combination of a driving shaft, a driven shaft, and means to transmit rotation from said driving shaft to said driven shaft comprising a beveled differential gearing, a casing inclosing said gearing, means to connect said differential gearing with said driving shaft, and means to connect said casing with said driven shaft.

15. The combination of a driving shaft, a driven shaft, and means to transmit rotation from said driving shaft to said driven shaft comprising a differential gearing, means to connect said driving shaft to said driven shaft through said differential gearing, and means to connect directly said driving shaft and said driven shaft and at the same time disconnect said differential gearing.

16. The combination of a driving shaft, a driven shaft, and means to transmit rotation from said driving shaft to said driven shaft comprising a differential gearing, means to connect said differential gearing to said driving shaft comprising a main shaft block, a sleeve on said block adapted to rotate freely thereon, means to connect said sleeve to said differential gearing, and means to connect and disconnect said sleeve to and from said main shaft block.

17. The combination of a driving shaft, a driven shaft, a differential gearing, gearing connecting said driving shaft with said differential gearing, gearing connecting said differential gearing with said driven shaft, and means for directly connecting said driving shaft with said driven shaft.

18. The combination of a driving shaft, a driven shaft, a differential gearing, gearing connecting said driving shaft with said differential gearing, gearing connecting said differential gearing with said driven shaft, and means for directly connecting such driving shaft with said driven shaft, said means comprising a clutch.

19. The combination of a driving shaft, a driven shaft, and means to transmit rotation from said driving shaft to said driven shaft comprising a beveled differential gearing, and means to connect said differential gearing to said driving shaft for rotation in either direction.

20. The combination of a driving shaft, a driven shaft, and means to transmit rotation from said driving shaft to said driven shaft by a gradual transition of speed of rotation, and means to disconnect said first mentioned means at any stage of said transition and connect said driving shaft and said driven shaft in a direct drive.

21. The combination of a driving shaft, a driven shaft, means to transmit rotation from said driving shaft to said driven shaft comprising a differential gearing, and means comprising a single lever to connect said shafts through said differential gearing and to disconnect said differential gearing from said shafts and connect said shafts in a direct drive.

22. The combination of a driving shaft, a driven shaft, means to transmit rotation from said driving shaft to said driven shaft comprising two shafts, a sleeve rotatably mounted on one of said shafts and adapted to be clutched thereto, a splined sleeve and a rotatably mounted gear on said other shaft said sleeve adapted to be clutched to said first mentioned shaft or to said gear, and gears comprising beveled differential gearing connecting said first mentioned sleeve and said gear.

23. The combination of a driving shaft, a driven shaft, means to transmit rotation from said driving shaft to said driven shaft comprising two shafts, one of which is adapted to rotate in a recess provided in the other, a sleeve rotatably mounted on one of said shafts and adapted to be clutched thereto, a splined sleeve and a rotatably mounted gear on said other shaft said sleeve adapted to be clutched to said first mentioned shaft or to said gear, and gears comprising beveled differential gearing connecting said first mentioned sleeve and said gear.

24. The combination of a driving shaft, a driven shaft, means to transmit rotation from said driving shaft to said driven shaft comprising two shafts, a sleeve rotatably mounted on one of said shafts and adapted to be clutched thereto, a splined sleeve and a rotatably mounted gear on said other shaft said sleeve adapted to be clutched to said first mentioned shaft or to said gear, gears comprising beveled differential gearing connecting said first mentioned sleeve and said gear, and means to move said sleeves to connect said shafts through said gears and to move said sleeves to disconnect said gears and connect said shafts in a direct drive.

25. The combination of a driving shaft, a driven shaft, means to transmit rotation from said driving shaft to said driven shaft comprising two shafts one of which is adapted to rotate in a recess provided in the other, a sleeve rotatably mounted on one of said shafts and adapted to be clutched thereto, a splined sleeve and a rotatably mounted gear on said other shaft said sleeve adapted to be clutched to said first mentioned shaft or to said gear, gears comprising beveled differential gearing connecting said first mentioned sleeve and said gear, and means to move said sleeves to connect said shafts through said gears and to move said sleeves to disconnect said gears and connect said shafts in a direct drive.

26. The combination of a driving shaft, a driven shaft, means to transmit rotation from said driving shaft to said driven shaft comprising a main gear, a counter shaft, a loose gear and a splined gear thereon normally clutched and with said loose gear in mesh with said main gear, a second counter shaft, and a keyed gear and a loose gear thereon normally unclutched with said keyed gear in mesh with said main gear and said loose gear in mesh with said splined gear.

27. The combination of a driving shaft, a driven shaft, means to transmit rotation from said driving shaft to said driven shaft comprising a main gear, a counter shaft, a loose gear and a splined gear thereon normally clutched and with said loose gear in mesh with said main gear, a second counter shaft, a keyed gear and a loose gear thereon normally unclutched with said keyed gear in mesh with said main gear and said loose gear in mesh with said splined gear, and means to unclutch the gears on said first counter shaft and clutch the gears on said second counter shaft.

28. The combination of a driving shaft, a driven shaft, means to connect said driving shaft and said driven shaft comprising a beveled differential gearing, a casing inclosing said gearing and means to brake one gear of said differential gearing to provide a variable speed for said driven shaft.

29. The combination of a driving shaft, a driven shaft, means to connect said driving shaft and said driven shaft comprising a beveled differential gearing, a casing inclosing said gearing, means on said casing to transmit rotation imparted to said differential gearing, and means applied to one of the gears of said differential gearing to control the speed of rotation transmitted and to permit said differential gearing to run idle.

30. The combination of a driving shaft, a driven shaft, and means to transmit rotation from said driving shaft to said driven shaft comprising a differential gearing, a brake for said differential gearing, and means to connect said differential gearing to said driven shaft comprising a gear connected to the casing of said differential gearing and located between said differential gearing and said brake.

In testimony that I claim the foregoing I have hereunto set my hand.

J. SANFORD HARGER.

Witnesses:
MARIAN I. DEMPSEY,
V. G. LLOYD.